US010218578B2

(12) United States Patent
Li

(10) Patent No.: US 10,218,578 B2
(45) Date of Patent: Feb. 26, 2019

(54) METHOD FOR CONTROLLING A MANAGEMENT DEVICE AND RELATED DEVICE

(71) Applicant: Huawei Technologies Co., Ltd., Shenzhen (CN)

(72) Inventor: Bo Li, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 470 days.

(21) Appl. No.: 14/981,085

(22) Filed: Dec. 28, 2015

(65) Prior Publication Data

US 2016/0112272 A1 Apr. 21, 2016

Related U.S. Application Data

(63) Continuation of application No. PCT/CN2014/082944, filed on Jul. 24, 2014.

(30) Foreign Application Priority Data

Jul. 24, 2013 (CN) .......................... 2013 1 0313835

(51) Int. Cl.
*G06F 15/173* (2006.01)
*H04L 12/24* (2006.01)
(Continued)

(52) U.S. Cl.
CPC ............ *H04L 41/12* (2013.01); *G06F 9/4881* (2013.01); *H04L 29/08* (2013.01); *H04L 67/10* (2013.01);
(Continued)

(58) Field of Classification Search
CPC ......... H04L 41/12; H04L 67/32; H04L 29/08; H04L 67/1031; H04L 67/10; G06F 9/4881
See application file for complete search history.

(56) References Cited

U.S. PATENT DOCUMENTS 9,344,521 B2 * 5/2016 Seago ..................... H04L 67/32
2004/0252696 A1 12/2004 Kakishima et al.
(Continued)

FOREIGN PATENT DOCUMENTS

CN 101163151 A 4/2008
CN 101625565 A 1/2010
(Continued)

OTHER PUBLICATIONS

Partial English Translation and Abstract of Chinese Patent Application No. CN102508626, Jan. 21, 2016, 7 pages.
(Continued)

*Primary Examiner* — John B Walsh
(74) *Attorney, Agent, or Firm* — Conley Rose, P.C.

(57) ABSTRACT

A method for controlling a management device may include receiving, by a virtual master device deployed in a cloud terminal device, a data processing instruction; and selecting, by the virtual master device, N2 entity subdevices from N1 entity subdevices a set policy, and instructing the selected N2 entity subdevices to perform data processing based on the data processing instruction, where N1 and N2 are positive integers, N2 is less than or equal to N1, the virtual master device and the N2 entity subdevices are of a same device type, and the N1 entity subdevices are deployed in the cloud terminal device or connected to the cloud terminal device. The embodiments of the present disclosure help improve flexibility in using multiple function devices of a same type when a cloud terminal device can be connected to the multiple function devices of the same type.

20 Claims, 11 Drawing Sheets

(51) Int. Cl.
  *H04L 29/08* (2006.01)
  *G06F 9/48* (2006.01)
(52) U.S. Cl.
  CPC ......... *H04L 67/1031* (2013.01); *H04L 67/32* (2013.01)

(56) References Cited

U.S. PATENT DOCUMENTS

| | | | |
|---|---|---|---|
| 2011/0126110 A1* | 5/2011 | Vilke | G06F 9/54 715/736 |
| 2012/0185848 A1 | 7/2012 | Devarakonda et al. | |
| 2012/0297383 A1* | 11/2012 | Meisner | G06F 3/165 718/1 |
| 2013/0163038 A1* | 6/2013 | Oishi | G06F 3/1204 358/1.15 |
| 2013/0262189 A1* | 10/2013 | Anderson | H04L 41/145 705/7.36 |
| 2014/0310704 A1* | 10/2014 | Cantu | G06F 9/45558 718/1 |

FOREIGN PATENT DOCUMENTS

| | | |
|---|---|---|
| CN | 102281180 A | 12/2011 |
| CN | 102508626 A | 6/2012 |
| CN | 102508714 A | 6/2012 |
| CN | 102662746 A | 9/2012 |
| CN | 103414763 A | 11/2013 |

OTHER PUBLICATIONS

Partial English Translation and Abstract of Chinese Patent Application No. CN103414763, Jul. 28, 2015, 4 pages.
Foreign Communication From a Counterpart Application, PCT Application No. PCT/CN2014/082944, English Translation of International Search Report dated Dec. 9, 2014, 2 pages.
Foreign Communication From a Counterpart Application, PCT Application No. PCT/CN2014/082944, Written Opinion dated Dec. 9, 2014, 5 pages.
Foreign Communication From a Counterpart Application, Chinese Application No. 201310313835.8, Chinese Office Action dated Dec. 24, 2015, 7 pages.
Schoeberl, M., et al., "A Hardware Abstraction Layer in Java," ACM Transactions on Embedded Computing Systems, vol. 10, No. 4, Article 42, Nov. 2011, 40 pages.
Foreign Communication From a Counterpart Application, European Application No. 14828780.8, Extended European Search Report dated Mar. 7, 2016, 9 pages.

* cited by examiner

| Entity audio subcard | Entity audio subcard A | Entity audio subcard B | Entity audio subcard C |
|---|---|---|---|
| Usage priority | 2 | 3 | 1 |

FIG. 2E

| | Entity audio subcard A | Entity audio subcard B | Entity audio subcard C |
|---|---|---|---|
| Music player application S1 | 1 | 2 | 3 |
| IP phone application S2 | 3 | 2 | 1 |

FIG. 2F

METHOD FOR CONTROLLING A MANAGEMENT DEVICE AND RELATED DEVICE

CROSS-REFERENCE TO RELATED APPLICATIONS

This application is a continuation of International Application No. PCT/CN2014/082944, filed on Jul. 24, 2014, which claims priority to Chinese Patent Application No. 201310313835.8, filed on Jul. 24, 2013, both of which are hereby incorporated by reference in their entireties.

TECHNICAL FIELD

The present disclosure relates to the field of communications technologies, and in particular, to a method for controlling a management device and a related device.

BACKGROUND

In recent years, explosive growth of cloud technologies drives rapid development of virtualization technologies and cloud terminal products. A cloud terminal product is connected to a cloud server using a cloud protocol, and the cloud server provides the cloud terminal product with a virtual personal computer (PC). A cloud desktop may allocate a corresponding hardware resource according to a requirement of a user.

Compared with a conventional PC, the virtual PC has advantages such as a small size, low power consumption, high security, high reliability, high resource utilization efficiency, and data processing available in a cloud server. In a reliable and stable network connection environment, cloud computing may replace a PC progressively.

Corresponding cloud client software is used locally in a cloud terminal to connect to a remote cloud server. A hardware device connecting to the cloud terminal can be used only after the hardware device is connected to both the client and the cloud server. At present, a related hardware device of the cloud terminal cannot be adapted dynamically due to a limitation of the cloud protocol, and if multiple same devices exist, only one of the multiple same devices can be selected for connection and only a device connecting to the cloud terminal can be used. If a local peripheral of the cloud terminal changes, the local peripheral can be used only after reconnecting to the cloud server, which seriously affects customer experience.

In an existing solution, a manner of connecting an entity device is used, and only a device currently connecting to the cloud terminal can be used. Now an audio card is used as an example to analyze an actual problem. It is assumed that a cloud terminal board has two built-in audio cards at present, which are marked as an audio card A and an audio card B, and a universal serial bus (USB) audio card is marked as an audio card C. When connecting to a virtual host of the cloud server, only one of same devices can be connected. When both the audio card A and the audio card B exist, only one of the audio card A and the audio card B can be connected. In other words, only one audio card device can be used at a same time point and multiple audio devices cannot be used at the same time.

For example, when a user watches a movie, a video card and the audio card A of the cloud terminal transmit, using a connection cable, a video signal and a sound signal to a television and a speaker respectively; in this way, perfect audio and visual enjoyment can be obtained. In this case, when a colleague or friend of the user calls the user using online instant messaging software, the user needs to use a microphone and a headset. However, no related interface is provided on the audio card A, and only the audio card B of the cloud terminal can be used for implementation; and now, the audio card B is in a non-connected and disabled state. In the prior art, in this case, the user can use the audio card B only after disconnecting a cloud desktop first, and reselecting and connecting to the audio card B.

SUMMARY

Embodiments of the present disclosure provide a method for controlling a management device and a related device so that when a cloud terminal device can be connected to multiple function devices (such as multiple network interface cards or multiple audio cards) of a same type, flexibility in using the multiple function devices of the same type is improved.

A first aspect of the present disclosure provides a method for controlling a management device, which may include receiving, by a virtual master device deployed in a cloud terminal device, a data processing instruction; and selecting, by the virtual master device, N2 entity subdevices from N1 entity subdevices according to a set policy, and instructing the selected N2 entity subdevices to perform data processing based on the data processing instruction, where N1 and N2 are positive integers, N2 is less than or equal to N1, the virtual master device and the N2 entity subdevices are of a same device type, and the N1 entity subdevices are deployed in the cloud terminal device or connected to the cloud terminal device.

With reference to the first aspect, in a first possible implementation manner, the selecting N2 entity subdevices from N1 entity subdevices according to a set policy includes acquiring priorities of being used separately corresponding to the N1 entity subdevices, and selecting N2 entity subdevices with highest priorities of being used from the N1 entity subdevices; or, acquiring priorities of being used separately corresponding to the N1 entity subdevices, and selecting, from the N1 entity subdevices, N2 currently unused entity subdevices with highest priorities of being used.

With reference to the first aspect, in a second possible implementation manner, the data processing instruction comes from an application program, where the selecting N2 entity subdevices from N1 entity subdevices according to a set policy includes selecting, from the N1 entity subdevices, N2 entity subdevices that the usage priority of the application program is highest; or, selecting, from the N1 entity subdevices, N2 currently unused entity subdevices that the usage priority of the application program is highest.

With reference to the first aspect, in a third possible implementation manner, the selecting N2 entity subdevices from N1 entity subdevices according to a set policy, and instructing the selected N2 entity subdevices to perform data processing based on the data processing instruction includes acquiring priorities of being used separately corresponding to the N1 entity subdevices, and if priorities of being used of the N2 entity subdevices in the N1 entity subdevices are the highest and the same, selecting the N2 entity subdevices, and instructing each entity subdevice in the N2 entity subdevices to process, according to a ratio of a usage weight of each entity subdevice to a total usage weight of the N2 entity subdevices, data that is requested by the data processing instruction to process.

With reference to the first aspect, in a fourth possible implementation manner, the data processing instruction comes from an application program, where the selecting N2 entity subdevices from N1 entity subdevices according to a set policy, and instructing the selected N2, entity subdevices to perform data processing based on the data processing instruction includes acquiring usage priorities for the N1 entity subdevices by the application program, and if usage priorities for the N2 entity subdevices in the N1 entity subdevices by the application program are the highest and the same, selecting the N2 entity subdevices, and instructing each entity subdevice in the N2 entity subdevices to process, according to a ratio of a usage weight of each entity subdevice to a total usage weight of the N2 entity subdevices, data that is requested by the data processing instruction to process.

With reference to the first aspect or the first possible implementation manner of the first aspect or the second possible implementation manner of the first aspect or the third possible implementation manner of the first aspect or the fourth possible implementation manner of the first aspect, in a fifth possible implementation manner, the virtual master device is a virtual network interface card, and the N1 entity subdevices are N1 entity network interface cards; or, the virtual master device is a virtual audio card, and the N1 entity subdevices are N1 entity audio cards; or, the virtual master device is a virtual video card, and the N1 entity subdevices are N1 entity video cards; or, the virtual master device is a virtual printer, and the N1 entity subdevices are N1 entity printers.

A second aspect of the present disclosure provides a cloud terminal device, where a virtual master device is deployed in the cloud terminal device, and the virtual master device includes a receiver configured to receive a data processing instruction; and a distribution manager configured to select N2 entity subdevices from the N1 entity subdevices according to a set policy, and instruct the selected N2 entity subdevices to perform data processing based on the data processing instruction, where N1 and N2 are positive integers, N2 is less than or equal to N1, the virtual master device and the N2 entity subdevices are of a same device type, and the N1 entity subdevices are deployed in the cloud terminal device or connected to the cloud terminal device.

With reference to the second aspect, in a first possible implementation manner, the distribution manager is configured to acquire priorities of being used separately corresponding to the N1 entity subdevices, select N2 entity subdevices with highest priorities of being used from the N1 entity subdevices, and instruct the selected N2 entity subdevices to perform data processing based on the data processing instruction; or the distribution manager is configured to acquire priorities of being used separately corresponding to the N1 entity subdevices, select, from the N1 entity subdevices, N2 currently unused entity subdevices with highest priorities of being used, and instruct the selected N2 entity subdevices to perform data processing based on the data processing instruction; or the distribution manager is configured to acquire priorities of being used separately corresponding to the N1 entity subdevices, and if priorities of being used of the N2 entity subdevices in the N1 entity subdevices are the highest and the same, select the N2 entity subdevices, and instruct each entity subdevice in the N2 entity subdevices to process, according to a ratio of a usage weight of each entity subdevice to a total usage weight of the N2, entity subdevices, data that is requested by the data processing instruction to process.

With reference to the second aspect, in a second possible implementation manner, the receiver is configured to receive the data processing instruction from an application program; and the distribution manager is configured to select, from the N1 entity subdevices, N2 entity subdevices that the usage priority of the application program is highest, and instruct the selected N2 entity subdevices to perform data processing based on the data processing instruction; or, the distribution manager is configured to select, from the N1 entity subdevices, N2 currently unused entity subdevices that the usage priority of the application program is highest, and instruct the selected N2 entity subdevices to perform data processing based on the data processing instruction; or, the distribution manager is configured to acquire usage priorities for the N1 entity subdevices by the application program, and if usage priorities for the N2 entity subdevices in the N1 entity subdevices by the application program are the highest and the same, select the N2, entity subdevices, and instruct each entity subdevice in the N2 entity subdevices to process, according to a ratio of a usage weight of each entity subdevice to a total usage weight of the N2, entity subdevices, data that is requested by the data processing instruction to process.

With reference to the second aspect or the first possible implementation manner of the second aspect or the second possible implementation manner of the second aspect, in a third possible implementation manner, the virtual master device is a virtual network interface card, and the N1 entity subdevices are N1 entity network interface cards; or, the virtual master device is a virtual audio card, and the N1 entity subdevices are N1 entity audio cards; or, the virtual master device is a virtual video card, and the N1 entity subdevices are N1 entity video cards; or, the virtual master device is a virtual printer, and the N1 entity subdevices are N1 entity printers.

It can be seen from the foregoing that in the embodiments of the present disclosure, a virtual master device is deployed in a cloud terminal device, and after the virtual master device receives a first data processing instruction, the virtual master device selects N2 entity subdevices from N1 entity subdevices deployed in the cloud terminal device or connected to the cloud terminal device, and instructs the N2 entity subdevices to perform data processing based on the first data processing instruction, where a first virtual master device and the N2 entity subdevices are of a same device type. A virtual master device that can be always in a connected and online state is introduced, and the virtual master device manages entity subdevices of a same type, thereby helping implement dynamic switching of multiple entity subdevices of a same type; in addition, when N2 is greater than 1, the multiple entity subdevices of the same type can be used simultaneously, and moreover, the virtual master device is used as an intermediate management node, and an application program may not sense a status of an entity subdevice, thereby helping implement plug-and-play of an entity subdevice newly connected to the cloud terminal device. It can be seen that, based on the foregoing technical solutions, when the cloud terminal device can be connected to the multiple function devices (such as multiple network interface cards or multiple audio cards or multiple video cards) of the same type, it helps improve flexibility in using the multiple function devices of the same type.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 2E is a schematic diagram of configuration of a priority of being used of an entity audio subcard according to an embodiment of the present disclosure;

FIG. 2F is a schematic diagram of configuration of a usage priority of an entity audio subcard by an application program according to an embodiment of the present disclosure;

DESCRIPTION OF EMBODIMENTS

Embodiments of the present disclosure provide a method for controlling a management device and a related device so as to improve flexibility in using multiple function devices of a same type when a cloud terminal device can be connected to the multiple function devices of the same type (such as multiple network interface cards or multiple audio cards).

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Details are described separately in the following.

In the specification, claims, and the foregoing accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

In an embodiment of a method for controlling a management device of the present disclosure, the method for controlling a management device may include receiving, by a virtual master device deployed in a cloud terminal device, a data processing instruction; selecting N2, entity subdevices from N1 entity subdevices according to a set policy; and instructing the N2, entity subdevices to perform data processing based on the data processing instruction, where the virtual master device and the N2 entity subdevices are of a same device type, N1 and N2 are positive integers, and the N1 entity subdevices are deployed in the cloud terminal device or connected to the cloud terminal device.

Figure 1:
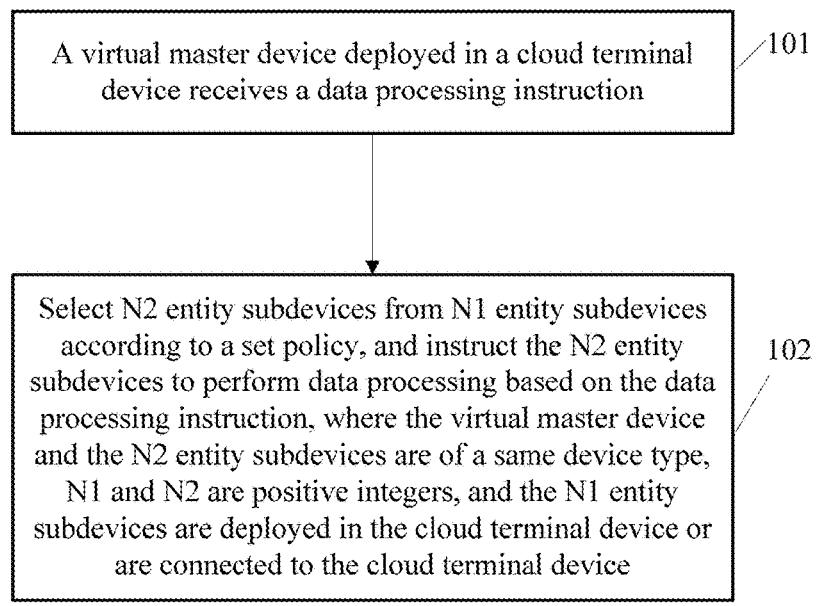
FIG. 1 is a schematic flowchart of a method for controlling a management device according to an embodiment of the present disclosure.

Referring to FIG. 1, FIG. 1 is a schematic flowchart of a method for controlling a management device according to an embodiment of the present disclosure. As shown in FIG. 1, the method for controlling a management device according to this embodiment of the present disclosure may include the following content.

101: A virtual master device (which, for ease of citation, may be called a first virtual master device) deployed in a cloud terminal device receives a data processing instruction (which, for ease of citation, may be called a first data processing instruction).

The first virtual master device may receive data processing instructions delivered by application programs. It may be understood that, for the application programs that deliver the data processing instructions, the first virtual master device is considered as a physical device.

The cloud terminal device may be a PC or a computer device of another type.

In some embodiments of the present disclosure, a processor in the cloud terminal device may execute specific code to display the virtual master device.

102: The virtual master device selects N2 entity subdevices from N1 entity subdevices according to a set policy, and instructs the N2 entity subdevices to perform data processing based on the first data processing instruction, where the virtual master device and the N2 entity subdevices are of a same device type, N1 and N2 are positive integers (for example, N1 is a positive integer greater than 1), and N1 is greater than or equal to N2. The N1 entity subdevices are deployed in the cloud terminal device or are connected to the cloud terminal device.

Figure 2A:
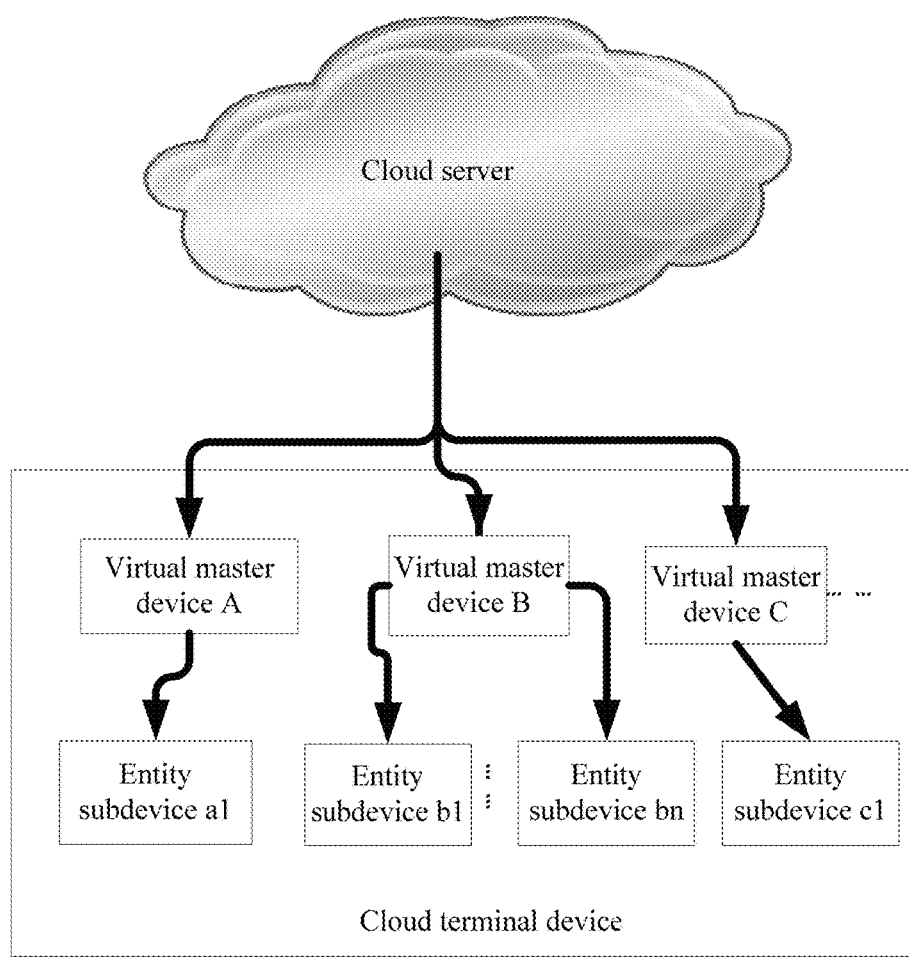
FIG. 2A to FIG. 2C are several schematic diagrams of deployment of a virtual master device and an entity subdevice according to an embodiment of the present disclosure.
Figure 2B:
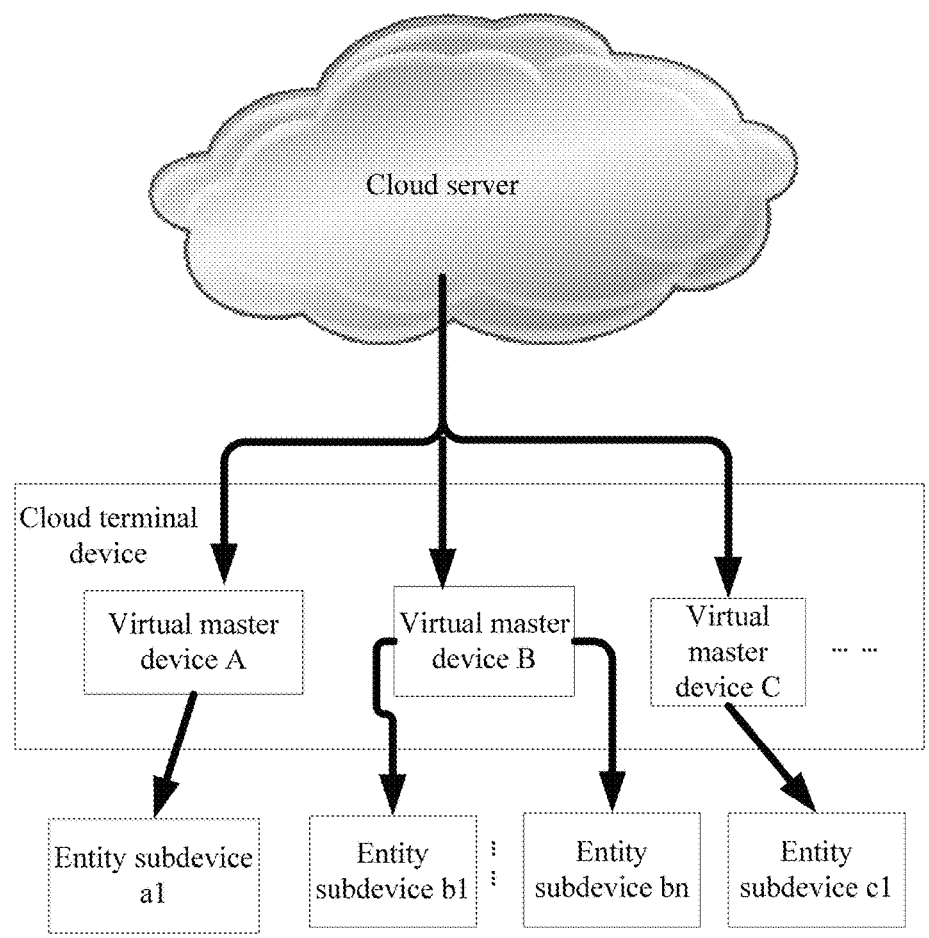
Figure 2C:
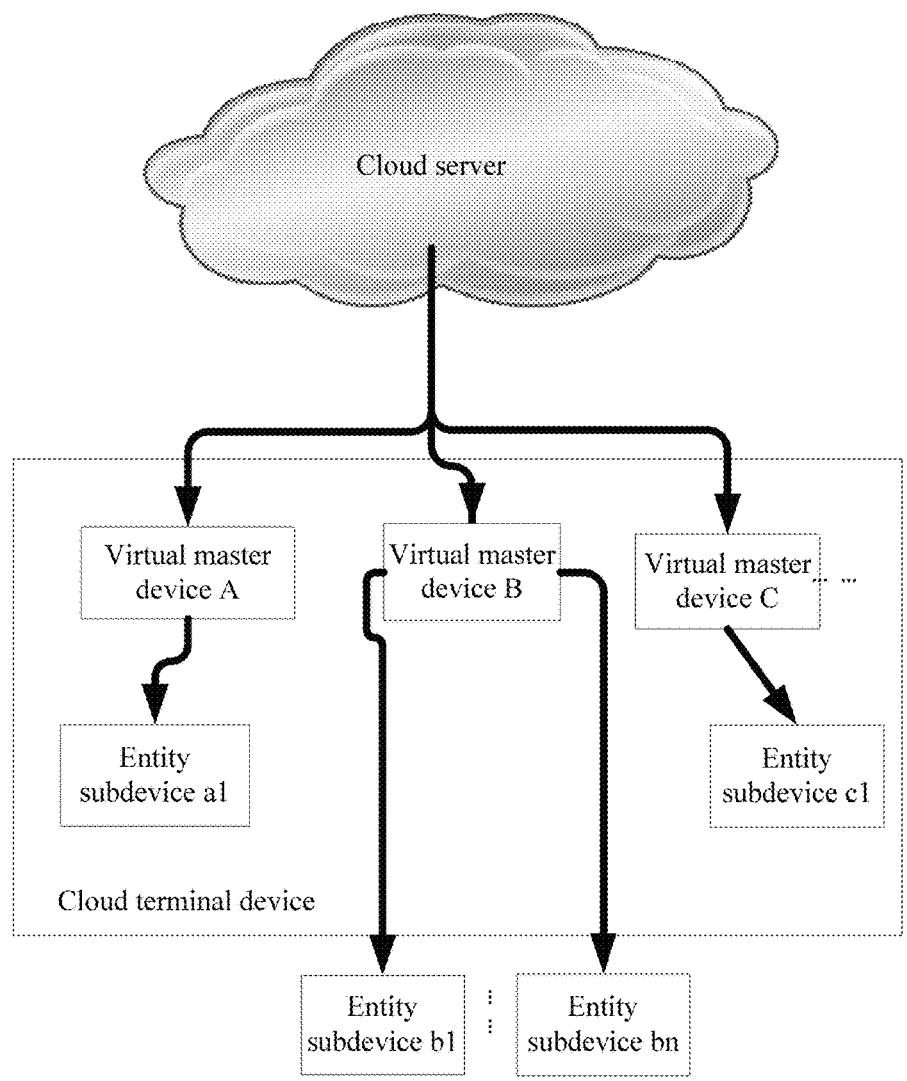

Referring to FIG. 2A, FIG. 2B, and FIG. 2C, FIG. 2A shows a scenario in which an entity subdevice is deployed in a cloud terminal device, that is, the entity subdevice may be a part of the cloud terminal device, for example, the entity subdevice may be a network interface card, an audio card, or a video card. In a scenario shown in FIG. 2B, an entity subdevice is not deployed in a cloud terminal device, but is connected to the cloud terminal device, that is, the entity subdevice may not be a part of the cloud terminal device, for example, the entity subdevice may be a peripheral device, such as a printer. In a scenario shown in FIG. 2C, some entity subdevices are deployed in a cloud terminal device, while some other entity subdevices are connected to the cloud terminal device. An application program may access, via a virtual master device, an entity subdevice that is of a same device type with the virtual master device.

In some embodiments of the present disclosure, a virtual master device may have a same peripheral universal access interface as an entity subdevice of a same type so as to facilitate use of another application program. For application programs that deliver data processing instructions, the virtual master device is considered as an entity device of the same type, for example, for an application program that needs to use a network interface card, a virtual network interface card is considered as an entity network interface card. For an application program that needs to use an audio card, the virtual network interface card is considered as an entity audio card. For an application program that needs to use a video card, the virtual network interface card is considered as an entity video card. For an application program that needs to use a printer, a virtual printer is considered as an entity printer, and so on. In addition, the virtual master device may even further support to be opened and used by multiple other application programs at the same time; and the virtual master device may even open and use multiple entity subdevices of a same type at the same time. Further, in some scenarios, when multiple application programs use a virtual master device at the same time, the virtual master device may perform merging processing on data that the multiple application programs request to process, to obtain merged data, and then instruct N2 entity subdevices selected from N1 entity subdevices to continue to process the merged data. For example, the virtual master device may perform audio mixing processing on audio data that the multiple application programs request to process, and then instruct N2 audio cards selected from N1 audio cards to perform audio decoding and playing on data obtained by audio mixing processing. It can be seen that an application program may invoke the virtual master device to smoothly invoke an entity device of a same type.

It may be understood that a virtual master device in the embodiments of the present disclosure is basically not responsible for implementing a data processing function of an entity subdevice of a same type, and the virtual master device is mainly responsible for performing scheduling, management, and the like, on the entity subdevice of the same type. For example, a virtual network interface card may not be responsible for implementing data uploading and downloading functions of an entity network interface card, but is mainly responsible for scheduling and managing working of one or more entity network interface cards served by the virtual network interface card. For another example, a virtual audio card may not be responsible for implementing an audio data decoding function of an entity audio card, but is mainly responsible for scheduling and managing working of one or more entity audio cards served by the virtual audio card. For another example, a virtual video card may not be responsible for implementing video data encoding and decoding functions of an entity video card, but is mainly responsible for scheduling and managing working of one or more entity video cards served by the virtual video card. For another example, a virtual printer may not be responsible for implementing a printing function of an entity printer, but is mainly responsible for scheduling and managing working of one or more entity printers served by the virtual printer. Scenarios of other device types are obtained by analogy, and examples are not further described herein.

The set policy may be varied, and therefore, manners in which a first virtual master device selects the N2 entity subdevices from the N1 entity subdevices according to the set policy may also be varied.

For example, the first virtual master device may select randomly the N2 entity subdevices from the N1 entity subdevices.

The first virtual master device may also select the N2 entity subdevices from the N1 entity subdevices with reference to one or more parameters, where the one or more parameters for reference of the first virtual master device may include at least one of the following parameters: a priority of being used of an entity subdevice, a usage weight of an entity subdevice, a usage priority for entity subdevices by an application program that delivers a data processing instruction, and the like. In some embodiments of the present disclosure, a virtual master device may configure (configuration may be performed based on a user instruction or self-configuration may be used) dynamically or statically a usage priority (some or all configurations may also be configured by default) for entity subdevices by application programs, and the like; and may further configure dynamically or statically priorities of being used and/or usage weights (some or all configurations may be configured by default) of the entity subdevices, and the like. The configuration information may be maintained by a corresponding virtual master device, and, may be maintained, for example, in a table or in another form by the virtual master device.

For example, that the first virtual master device selects the N2 entity subdevices from the N1 entity subdevices according to the set policy may include acquiring, by the first virtual master device, priorities of being used separately corresponding to the N1 entity subdevices and selecting N2 entity subdevices with highest priorities of being used from the N1 entity subdevices. It may be understood that, when N2 is equal to 1, it represents that one entity subdevice with a highest priority of being used is selected from the N1 entity subdevices; when N2 is equal to 2, it represents that two entity subdevices with highest priorities of being used are selected from the N1 entity subdevices, and other cases are obtained by analogy.

For another example, that the first virtual master device selects the N2 entity subdevices from the N1 entity subdevices according to the set policy may include acquiring, by the first virtual master device, priorities of being used separately corresponding to the N1 entity subdevices and selecting, from the N1 entity subdevices, N2 currently unused entity subdevices with highest priorities of being used. It may be understood that, when N2 is equal to 1, it represents that one currently unused entity subdevice with a highest priority of being used is selected from the N1 entity subdevices; when N2 is equal to 2, it represents that two currently unused entity subdevices with highest priorities of being used are selected from the N1 entity subdevices, and other cases are obtained by analogy.

For another example, assuming that a first data processing instruction comes from a first application program, that the first virtual master device selects the N2 entity subdevices from the N1 entity subdevices according to the set policy may include selecting, from the N1 entity subdevices, by the first virtual master device, N2 entity subdevices that the first application program has relatively high usage priorities. It may be understood that, when N2 is equal to 1, it represents that one entity subdevice that the first application program has a highest usage priority is selected from the N1 entity subdevices; when N2 is equal to 2, it represents that two entity subdevices that the first application program have highest usage priorities are selected from the N1 entity subdevices, and other cases are obtained by analogy.

For another example, assuming that the first data processing instruction comes from the first application program, that the first virtual master device selects the N2 entity subdevices from the N1 entity subdevices according to the set policy may include selecting, from the N1 entity subdevices, by the first virtual master device, N2 currently unused entity subdevices that the first application program has a relatively high usage priority. It may be understood that, when N2 is equal to 1, it represents that one currently unused entity subdevice that the first application program has a highest usage priority is selected from the N1 entity subdevices; when N2 is equal to 2, it represents that two currently unused entity subdevices that the first application program have highest usage priorities are selected from the N1 entity subdevices, and other cases are obtained by analogy.

In some embodiments of the present disclosure, if a first virtual master device is a virtual network interface card, the N1 entity subdevices are N1 entity network interface cards; or, if a first virtual master device is a virtual audio card, the N1 entity subdevices are N1 entity audio cards; or, if a first virtual master device is a virtual video card, the N1 entity subdevices are N1 entity video cards; or, if a first virtual master device is a virtual printer, the N1 entity subdevices are N1 entity printers. In conclusion, the first virtual master device and the N1 entity subdevices are of a same device type, and other scenarios are obtained by analogy.

For example, assuming that there are three application programs A, B, and C that may use a video card, and assuming that two entity video cards S1 and S2 exist, usage priorities for the entity video cards S1 and S2 by the three application programs A, B, and C may be dynamically or statically configured. It is assumed that the application program A has a highest usage priority to use the video card S1, the application program B has a second highest priority, and the application program C has a lowest priority; whereas, to the application program C has a highest usage priority to use the video card S2, the application program B has a second highest priority, and the application program A has a lowest priority. Under this configuration condition, assuming that only the application program A needs to use a video card at a same moment, a virtual master video card (namely, a virtual master device) may schedule, according to configuration information, a physical video card S1 to process related data that the application program A requests to process, because the application program A has a highest usage priority to use the physical video card S1. Also assuming that the application program A and the application program B need to use a video card at a same moment, a virtual video card may schedule, according to the configuration information, the physical video card S1 to process related data that the application program A requests to process, and the virtual video card may schedule, according to the configuration information, a physical video card S2 to process related data that the application program A requests to process, because the application program A has a higher usage priority than the application program B to use the physical video card S1, and the application program B has a higher usage priority than the application program A to use the physical video card S2. Also assuming that the application program B and the application program C need to use a video card at a same moment, the virtual master video card may schedule, according to the configuration information, the physical video card S1 to process related data that the application program B requests to process, and schedule the physical video card S2 to process related data that the application program C requests to process, because the application program B has a higher usage priority than the application program C to use the physical video card S1, and the application program C has a higher usage priority than the application program B to use the physical video card S2, and so on.

In some embodiments of the present disclosure, a virtual master device may dynamically or periodically detect a working status of entity subdevices managed by the virtual master device, where the working status of an entity subdevice includes a running state (for example, an idle state or a busy state), a stop state, and the like. If it is detected that an entity subdevice is in a stop state, it represents that the entity subdevice currently may be faulty or the entity subdevice is currently not connected to a cloud terminal device in which the virtual master device is deployed.

In some embodiments of the present disclosure, a virtual master device may configure usage weights of entity subdevices of a same type that are managed by the virtual master device, where a value range of a usage weight of an entity subdevice may be 0 percent (%) to 100%. When usage priorities for several entity subdevices by an application program are the same and the highest at a same moment, a ratio of data that is requested by the application program to process and that needs to be processed by the several entity subdevices may be determined according to usage weights of the several entity subdevices. Assuming that usage priorities for N entity subdevices by an application program are the same and the highest (or usage priorities for N entity subdevices are not configured by the application program, and priorities of being used of the N entity subdevices are the same and the highest), usage weights of the N entity subdevices are $D_1$ %, $D_2$ %, . . . , and $D_n$ % separately; and assuming that a ratio of data that is requested by the application program to process and that needs to be processed by an entity subdevice n (a usage weight of the entity subdevice n is $D_n$ % ) in the N entity subdevices is represented by $d_n$, then, $$d_n = \frac{D_n}{\sum_{x=1}^{N} D_x} \times 100\%$$

A ratio of data that is requested by the application program to process and that needs to be processed by another entity subdevice can be obtained by analogy. Using a scenario in which a virtual master printer manages multiple entity sub-printers as an example, in a common office environment, multiple network printers may be connected to a same network. However, in the prior art, only one printer can be selected, at a same moment, for printing. If a file with 1000 pages needs to be printed, efficiency of one printer is 20 pages per minute, and there are 10 same printers on the network. In the prior art, only one printer can be selected, at a same moment, for printing, and printing time is about 50 minutes. In addition, only one printer operates and other printers are all in an idle state, leading to a low utilization rate of resource efficiency. If the virtual master printer in the embodiments of the present disclosure is used to manage all entity sub-printers, a problem is solved smoothly. The virtual master printer may perform configuration on entity sub-printers, priorities of being used of 10 entity sub-printers are configured to be the same, the virtual master printer may divide, according to a ratio (a virtual master device may configure, according to print efficiency of each entity sub-printer, a usage weight of each entity sub-printer, for example, an entity sub-printer with higher efficiency is set to be a higher usage weight) of the usage weight of each entity printer to a total usage weight of the 10 entity sub-printers, to-be-printed content into 10 parts, and the virtual master printer instructs the entity sub-printers to print a corresponding part of the to-be-printed content. Multiple entity sub-printers are called at the same time, and therefore, a print speed may be greatly increased, and other scenarios are obtained by analogy.

In some embodiments of the present disclosure, a value range of a usage priority for an entity subdevice by an application program may be, for example, 1 to 100, where, for example, a smaller value represents a higher priority. In some embodiments of the present disclosure, an application program with a higher usage priority may even preempt a device resource of an application program with a lower usage priority. Multiple application programs that have a same usage priority for an entity subdevice may use the entity subdevice (for example, a virtual master device may mix data requested by the multiple application programs to process, to obtain mixed data, and then instruct the entity subdevice to process the mixed data) jointly, or, multiple application programs that have a same usage priority for an entity subdevice may determine, according to a principle of first-come first-served, which application program uses the entity subdevice. In this scenario, the entity subdevice is used exclusively by one application program at a same moment. If an entity subdevice is currently used by an application program A, even though an application program B has a higher priority than the application program A for using the entity subdevice, because the entity subdevice is in a used state (a busy state) currently, the virtual master device cannot invoke the application program B currently to use the entity subdevice, that is, the virtual master device does not allocate a data processing instruction coming from the application program B to the entity subdevice for processing, and the virtual master device may allocate the data processing instruction coming from the application program B to another entity subdevice (where the another entity subdevice is, for example, a currently unused entity subdevice that the application program B has a highest usage priority) for processing.

In some embodiments of the present disclosure, when an entity subdevice is selected, a reference priority of a usage priority for an entity subdevice by an application program is higher than a priority of being used of the entity subdevice. For example, when a virtual master device receives a data processing instruction delivered by an application program, the virtual master device may preferentially consider usage priorities for entity subdevices by the application program, and select an entity subdevice that the usage priority of the application program is highest to process the data processing instruction. If usage priorities for several entity subdevices by the application program are the same and the highest, an entity subdevice with a highest priority of being used in the several entity subdevices may be selected to process the data processing instruction.

For example, at present, application programs A and B need to use entity subdevices managed by a virtual master device X, where the virtual master device X manages entity subdevices x1, x2, and x3. If the application program A sets usage priorities for the entity subdevices, the usage priorities for the entity subdevices x1, x2, and x3 are in descending order; however, the application program B does not set usage priorities (when the priorities are not set, it is considered by default that the usage priorities for the entity subdevices x1, x2, and x3 by the application program B may be the same and are the lowest usage priorities) for using the entity subdevices x1, x2, and x3. If both the application programs A and B request to use, at a same moment, entity subdevices managed by the virtual master device X, the virtual master device X may directly allocate the entity subdevice x1 to the application program A to use; and in this case, it is assumed that the entity subdevice x2 is exclusively occupied by the application program A. Assuming that priorities of being used of the entity subdevices x1, x2, and x3 are set, the virtual master device X allocates one entity subdevice with a higher priority of being used between the entity subdevices x2 and x3 to the application program B to use. If the priorities of being used (when the priorities is not set, it is considered by default that the priorities of being used of the entity subdevices x1, x2, and x3 may be the same and are the lowest priorities of being used) of the entity subdevices x1, x2, and x3 are not set, the virtual master device X may allocate any one between the entity subdevices x2 and x3 to the application program B to use.

In a particular scenario, when an entity subdevice is selected, a reference priority of a usage priority for the entity subdevice by an application program may also be lower than a priority of being used of the entity subdevice. In this scenario, for example, when a virtual master device receives a data processing instruction delivered by an application program, the virtual master device may preferentially consider priorities of being used of entity subdevices, and select an entity subdevice with a highest priority of being used to process the data processing instruction. If priorities of being used of the several entity subdevices are the same and the highest, an entity subdevice that the usage priority of the application program is highest may be selected from the several entity subdevices to process the data processing instruction.

In some embodiments of the present disclosure, a virtual master device may support that multiple entity subdevices managed by the virtual maser device are used by an application program at a same moment, and may support that each entity subdevice is used by multiple application programs jointly at a same moment, or may only support that each entity subdevice is used by one application program exclusively at a same moment. In some other embodiments of the present disclosure, a virtual master device may also allow only one entity subdevice of multiple entity subdevices managed by the virtual master device to be used by one or more application programs at a same moment.

In some embodiments of the present disclosure, a virtual master device may modify priorities of being used of entity subdevices and/or modify a usage priority for an entity subdevice by an application program so that the application program uses any entity subdevice. A working status of an entity subdevice that can be used by an application program should be a running state (for example, an idle state or a busy state), an entity subdevice in a stop state cannot be used by the application program, and the virtual master device may learn a working status of each entity subdevice by means of monitoring, thereby helping implement plug-and-play of the entity subdevice. For some devices that need to be used temporarily, such as a USB smartcard, a scanner, and a patch cord (a USB to parallel interface), after the cloud terminal device is connected to a cloud desktop, the virtual master device is connected to the cloud desktop. Therefore, when the cloud desktop needs to use these temporary devices, the temporary devices are inserted into the cloud terminal device, and the virtual master device may find an inserted temporary device by monitoring a status. In this way, these temporary devices can be used quickly and conveniently.

It can be seen from the foregoing that in this embodiment, a virtual master device is deployed in a cloud terminal device, and after the virtual master device receives a first data processing instruction, the virtual master device selects N2 entity subdevices from N1 entity subdevices deployed in the cloud terminal device or connected to the cloud terminal device, and instructs the N2 entity subdevices to perform data processing based on the first data processing instruction, where a first virtual master device and the N2 entity subdevices are of a same device type. A virtual master device that can be always in a connected and online state is introduced, and the virtual master device manages entity subdevices of a same type, thereby helping implement dynamic switching of multiple entity subdevices of a same type; in addition, when N2, is greater than 1, the multiple entity subdevices of the same type can be used simultaneously, and moreover, the virtual master device is used as an intermediate management node, and an application program may not sense a status of an entity subdevice, thereby helping implement plug-and-play of an entity subdevice newly connected to the cloud terminal device. It can be seen that, based on the foregoing technical solutions, when the cloud terminal device can be connected to the multiple function devices (such as multiple network interface cards or multiple audio cards or multiple video cards) of the same type, it helps improve flexibility in using the multiple function devices of the same type.

For ease of better understanding and implementation, the following uses several scenarios as examples for description.

Figure 2D:
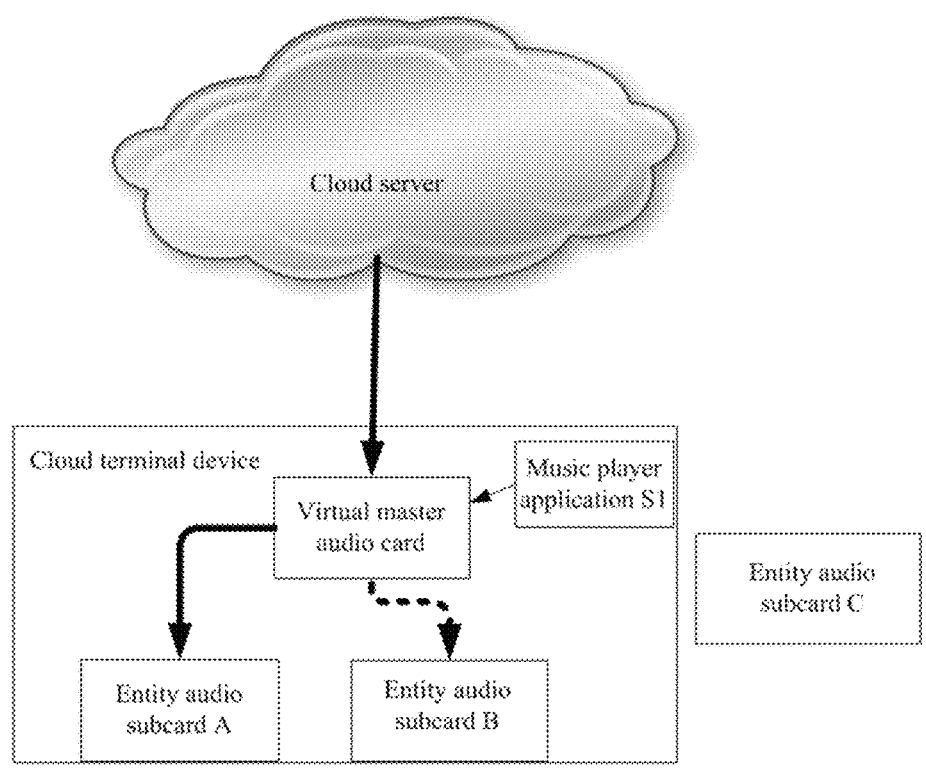
FIG. 2D, and FIG. 2G to FIG. 2I are several schematic diagrams of deployment of a virtual master audio card and an entity audio subcard according to an embodiment of the present disclosure.

Referring to FIG. 2D, a virtual master audio card is deployed in a cloud terminal device, and the virtual master audio card may manage the entity audio subcards deployed in the cloud terminal device. In the figure, for example, an entity audio subcard A outputs a voice signal to a speaker, an entity audio subcard B provides access interfaces of a microphone and a headset, and an entity audio subcard C is not inserted into the cloud terminal device temporarily.

As shown in FIG. 2E, it is assumed that the virtual master audio card configures priorities of being used of the entity audio subcard A, the entity audio subcard B, and the entity audio subcard C, where the entity audio subcard C has a highest priority of being used, the entity audio subcard A has a second highest priority of being used, and the entity audio subcard B has a lowest priority of being used. As shown in FIG. 2F, it is assumed that the virtual master audio card configures usage priorities for entity audio subcards by a music player application S1, where a usage priority for the entity audio subcard A is the highest, a usage priority for the entity audio subcard B is the second highest, and a usage priority for the entity audio subcard C is the lowest. As shown in FIG. 2F, it is assumed that the virtual master audio card further configures usage priorities for entity audio subcards by an Internet Protocol (IP) phone application S2, where a usage priority for the entity audio subcard C is the highest, a usage priority for the entity audio subcard B is the second highest, and a usage priority for the entity audio subcard A is the lowest.

Therefore, when the virtual master audio card receives a data processing instruction that comes from the music player application S1, the virtual master audio card may select the entity audio subcard A according to the usage priorities for entity audio subcards by the music player application S1, and instruct the entity audio subcard A to perform data processing based on the data processing instruction that comes from the music player application S1. The entity audio subcard A may play, for example, some audio files instructed by the data processing instruction to play. In FIG. 2D, a solid line represents a working channel, and a dashed line represents a temporarily non-working channel.

Figure 2G:
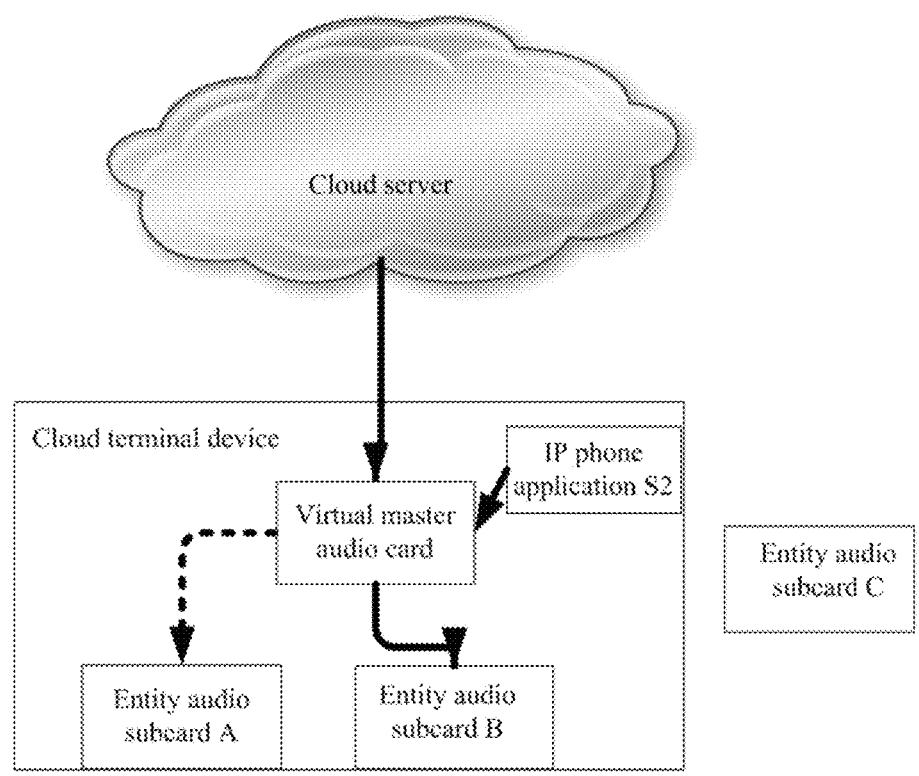

For another example, as shown in FIG. 2G, it is assumed that when the virtual master audio card receives a data processing instruction that comes from the IP phone application S2, the virtual master audio card selects the entity audio subcard B (because the entity audio subcard C with a highest usage priority is not inserted into the cloud terminal device currently) according to the usage priorities for entity audio subcards by the IP phone application S2, and instructs the entity audio subcard B to perform data processing based on the data processing instruction that comes from the IP phone application S2. The entity audio subcard B may play, for example, a telephone sound that is instructed by the data processing instruction to play, and collect local voice by using the microphone. In FIG. 2G, a solid line represents a working channel, and a dashed line represents a temporarily non-working channel.

Figure 2H:
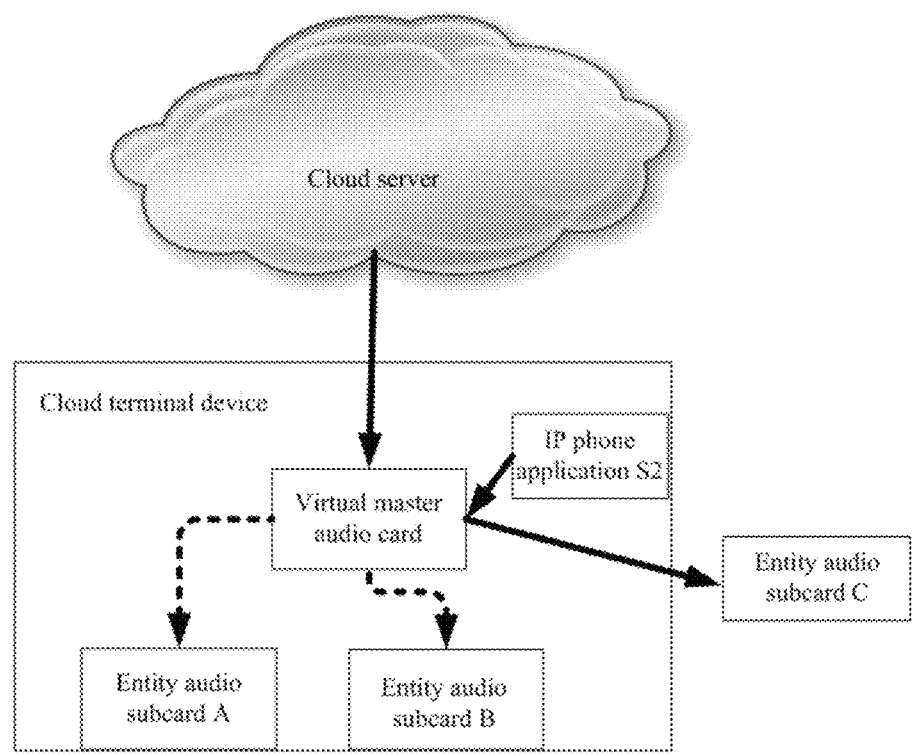

For another example, as shown in FIG. 2H, assuming that the entity audio subcard C is newly inserted into the cloud terminal device, the IP phone application S2 has a higher usage priority to the entity audio subcard C, and therefore, the virtual master audio card may pause processing of the entity audio subcard B on the data processing instruction that comes from the IP phone application S2, and the virtual master audio card turns to instruct the entity audio subcard C to process the data processing instruction that comes from the IP phone application S2. In FIG. 2H, a solid line represents a working channel, and a dashed line represents a temporarily non-working channel. In an actual application, when the virtual master audio card selects the entity audio subcard B to process the data processing instruction that comes from the IP phone application S2, the entity audio subcard B processes the data processing instruction during one session, not changing to another entity audio subcard. That is, even though the entity audio subcard C is inserted into the cloud terminal device halfway, the virtual master audio card still instructs the entity audio subcard B to process the data processing instruction that comes from the IP phone application S2.

Figure 2I:
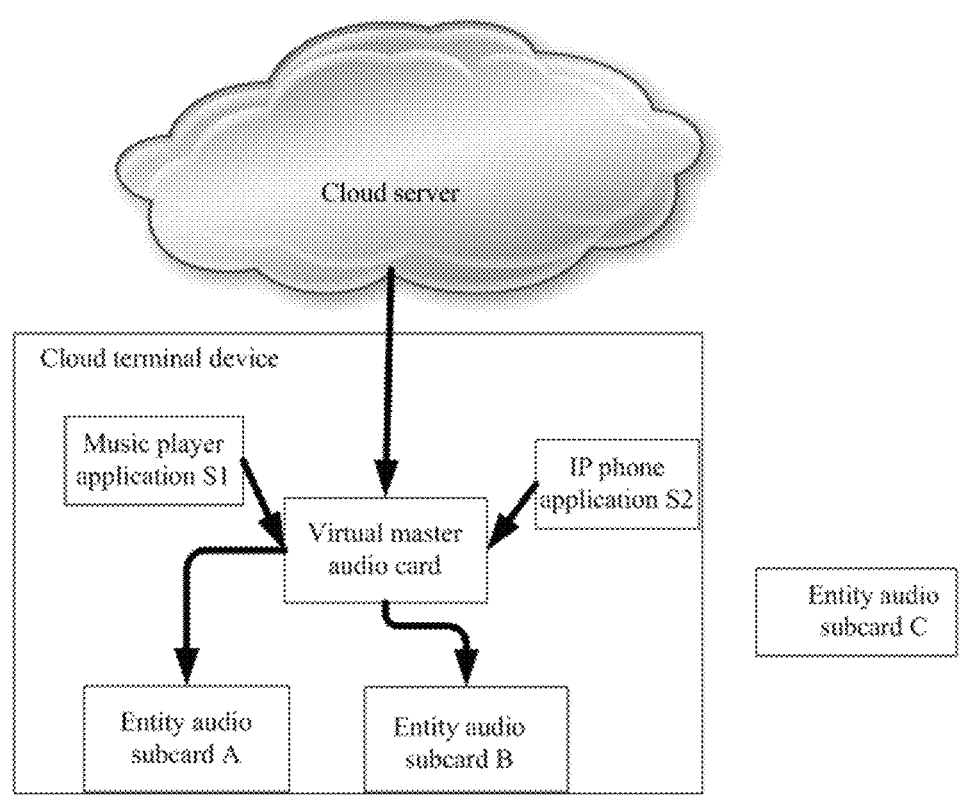

For another example, in FIG. 2I, assuming that, when the virtual master audio card receives a data processing instruction that comes from the IP phone application S2 and a data processing instruction that comes from the music player application S1, the virtual master audio card may select the entity audio subcard A according to the usage priorities for entity audio subcards by the music player application S1, and instruct the entity audio subcard A to perform data processing based on the data processing instruction that comes from the music player application S1. The entity audio subcard A may play, for example, some audio files instructed by the data processing instruction to play. The virtual master audio card may further select the entity audio subcard B (because the entity audio subcard C with a highest usage priority is not inserted into the cloud terminal device currently) according to the usage priorities for entity audio subcards by the IP phone application S2, and instruct the entity audio subcard B to perform data processing based on the data processing instruction that comes from the IP phone application S2, where the entity audio subcard B may play, for example, a telephone sound instructed by the data processing instruction to play, and collect local voice by using a microphone. In FIG. 2I, a solid line represents a working channel, and a dashed line represents a temporarily non-working channel. FIG. 2I provides an example to represent that the virtual master audio card may instruct multiple entity audio subcards to work simultaneously. The cloud terminal device may simultaneously implement several relatively independent functions without interference to each other.

In the examples shown in FIG. 2D to FIG. 2I, that a virtual master audio card manages an entity audio subcard is used as an example for description, and scenarios in which a virtual master video card manages an entity video subcard, a virtual master printer manages an entity sub-printer, and a virtual master network interface card manages an entity network interface subcard can be obtained by analogy.

The embodiments of the present disclosure in the following further provide related apparatuses used to implement the foregoing solutions.

Figure 3:
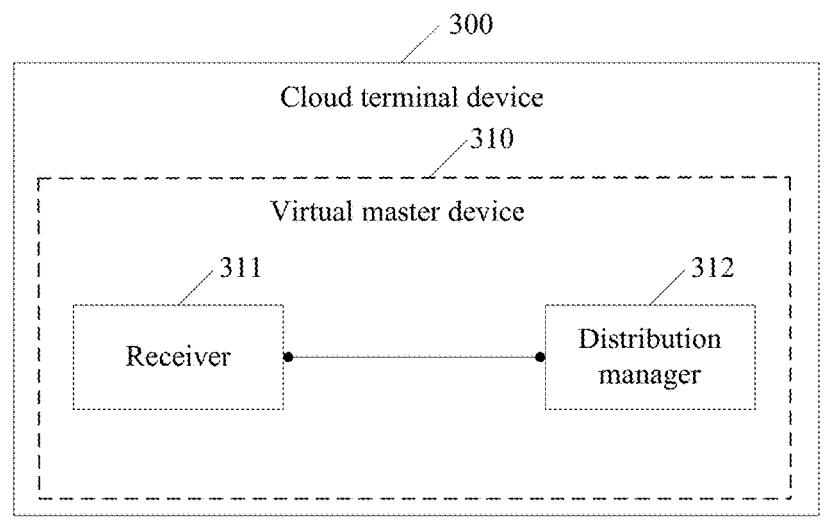
FIG. 3 is a schematic diagram of a cloud terminal device according to an embodiment of the present disclosure.

Referring to FIG. 3, an embodiment of the present disclosure further provides a cloud terminal device 300, where a virtual master device 310 is deployed in the cloud terminal device 300, and the virtual master device 310 may include a receiver 311 and a distribution manager 312.

The receiver 311 is configured to receive a data processing instruction.

The distribution manager 312 is configured to select N2 entity subdevices from the N1 entity subdevices according to a set policy, and instruct the selected N2 entity subdevices to perform data processing based on the data processing instruction, where N1 and N2 are positive integers, N2 is less than or equal to N1, the virtual master device 310 and the N2 entity subdevices are of a same device type, and the N1 entity subdevices are deployed in the cloud terminal device or connected to the cloud terminal device.

In some embodiments of the present disclosure, the distribution manager 312 may be configured to acquire priorities of being used separately corresponding to the N1 entity subdevices, select N2 entity subdevices with highest priorities of being used from the N1 entity subdevices, and instruct the selected N2 entity subdevices to perform data processing based on the data processing instruction; or the distribution manager 312 may be configured to acquire priorities of being used separately corresponding to the N1 entity subdevices, select, from the N1 entity subdevices, N2 currently unused entity subdevices with highest priorities of being used, and instruct the selected N2 entity subdevices to perform data processing based on the data processing instruction; or the distribution manager 312 may be configured to acquire priorities of being used separately corresponding to the N1 entity subdevices, and if priorities of being used of the N2 entity subdevices in the N1 entity subdevices are the highest and the same, select the N2 entity subdevices, and instruct each entity subdevice in the N2 entity subdevices to process, according to a ratio of a usage weight of each entity subdevice to a total usage weight of the N2, entity subdevices, data that is requested by the data processing instruction to process.

In some other embodiments of the present disclosure, the receiver 311 may be configured to receive a data processing instruction coming from an application program.

The distribution manager 312 may be configured to select, from the N1 entity subdevices, N2 entity subdevices that the usage priority of the application program is highest, and instruct the selected N2 entity subdevices to perform data processing based on the data processing instruction; or the distribution manager 312 may be configured to select, from the N1 entity subdevices, N2 currently unused entity subdevices that the usage priority of the application program is highest, and instruct the selected N2 entity subdevices to perform data processing based on the data processing instruction; or the distribution manager 312 may be configured to acquire usage priorities for the N1 entity subdevices by the application program, and if usage priorities for the N2 entity subdevices in the N1 entity subdevices by the application program are the highest and the same, select the N2 entity subdevices, and instruct each entity subdevice in the N2 entity subdevices to process, according to a ratio of a usage weight of each entity subdevice to a total usage weight of the N2 entity subdevices, data that is requested by the data processing instruction to process.

In some embodiments of the present disclosure, the virtual master device 310 is a virtual network interface card, and the N1 entity subdevices are N1 entity network interface cards; or, the virtual master device 310 is a virtual audio card, and the N1 entity subdevices are N1 entity audio cards; or, the virtual master device 310 is a virtual video card, and the N1 entity subdevices are N1 entity video cards; or, the virtual master device 310 is a virtual printer, and the N1 entity subdevices are N1 entity printers.

It may be understood that functions of function modules of the cloud terminal device 300 in this embodiment may be implemented according to the methods in the foregoing method embodiments. For a specific implementation process of the functions of the function modules, reference may be made to a related description of the foregoing method embodiments, and details are not described herein again.

It can be seen from the foregoing that in this embodiment, the virtual master device is deployed in the cloud terminal device, and after the virtual master device receives a first data processing instruction, the virtual master device selects N2 entity subdevices from N1 entity subdevices deployed in the cloud terminal device or connected to the cloud terminal device, and instructs the N2 entity subdevices to perform data processing based on the first data processing instruction, where a first virtual master device and the N2 entity subdevices are of a same device type. A virtual master device that can be always in a connected and online state is introduced, and the virtual master device manages entity subdevices of a same type, thereby helping implement dynamic switching of multiple entity subdevices of a same type; in addition, when N2, is greater than 1, the multiple entity subdevices of the same type can be used simultaneously, and moreover, the virtual master device is used as an intermediate management node, and an application program may not sense a status of an entity subdevice, thereby helping implement plug-and-play of an entity subdevice newly connected to the cloud terminal device. It can be seen that, based on the foregoing technical solutions, when the cloud terminal device can be connected to the multiple function devices (such as multiple network interface cards or multiple audio cards or multiple video cards) of the same type, it helps improve flexibility in using the multiple function devices of the same type.

Figure 4:
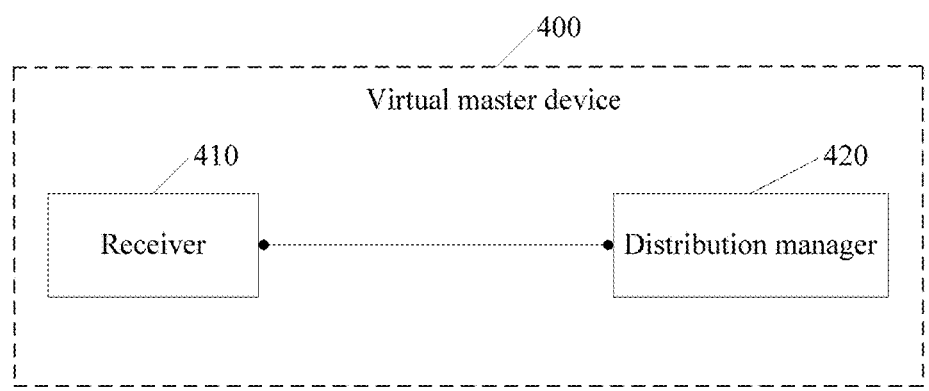
FIG. 4 is a schematic diagram of a virtual master device according to an embodiment of the present disclosure.

Referring to FIG. 4, an embodiment of the present disclosure further provides a virtual master device 400, where the virtual master device 400 is deployed in a cloud terminal device, and the virtual master device 400 may include a receiver 410 and a distribution manager 420.

The receiver 410 is configured to receive a data processing instruction.

The distribution manager 420 is configured to select N2 entity subdevices from the N1 entity subdevices according to a set policy, and instruct the selected N2 entity subdevices to perform data processing based on the data processing instruction, where N1 and N2 are positive integers, N2 is less than or equal to N1, the virtual master device 400 and the N2 entity subdevices are of a same device type, and the N1 entity subdevices are deployed in the cloud terminal device or connected to the cloud terminal device.

In some embodiments of the present disclosure, the distribution manager 420 may be configured to acquire priorities of being used separately corresponding to the N1 entity subdevices, select N2 entity subdevices with highest priorities of being used from the N1 entity subdevices, and instruct the selected N2 entity subdevices to perform data processing based on the data processing instruction; or the distribution manager 420 may be configured to acquire priorities of being used separately corresponding to the N1 entity subdevices, select, from the N1 entity subdevices, N2 currently unused entity subdevices with highest priorities of being used, and instruct the selected N2 entity subdevices to perform data processing based on the data processing instruction; or the distribution manager 420 may be configured to acquire priorities of being used separately corresponding to the N1 entity subdevices, and if priorities of being used of the N2 entity subdevices in the N1 entity subdevices are the highest and the same, select the N2 entity subdevices, and instruct each entity subdevice in the N2 entity subdevices to process, according to a ratio of a usage weight of each entity subdevice to a total usage weight of the N2, entity subdevices, data that is requested by the data processing instruction to process.

In some other embodiments of the present disclosure, the receiver 410 may be configured to receive a data processing instruction coming from an application program.

The distribution manager 420 may be configured to select, from the N1 entity subdevices, N2 entity subdevices that the usage priority of the application program is highest, and instruct the selected N2 entity subdevices to perform data processing based on the data processing instruction; or the distribution manager 420 may be configured to select, from the N1 entity subdevices, N2 currently unused entity subdevices that the usage priority of the application program is highest, and instruct the selected N2 entity subdevices to perform data processing based on the data processing instruction; or the distribution manager 420 may be configured to acquire usage priorities for the N1 entity subdevices by the application program, and if usage priorities for the N2 entity subdevices in the N1 entity subdevices by the application program are the highest and the same, select the N2 entity subdevices, and instruct each entity subdevice in the N2 entity subdevices to process, according to a ratio of a usage weight of each entity subdevice to a total usage weight of the N2 entity subdevices, data that is requested by the data processing instruction to process.

In some embodiments of the present disclosure, the virtual master device 400 is a virtual network interface card, and the N1 entity subdevices are N1 entity network interface cards; or, the virtual master device 400 is a virtual audio card, and the N1 entity subdevices are N1 entity audio cards; or, the virtual master device 400 is a virtual video card, and the N1 entity subdevices are N1 entity video cards; or, the virtual master device 400 is a virtual printer, and the N1 entity subdevices are N1 entity printers.

It may be understood that functions of function modules of the virtual master device 400 in this embodiment may be implemented according to the methods in the foregoing method embodiments. For a specific implementation process of the functions of the function modules, reference may be made to a related description of the foregoing method embodiments, and details are not described herein again.

It can be seen from the foregoing that in this embodiment, the virtual master device is deployed in a cloud terminal device, and after the virtual master device receives a first data processing instruction, the virtual master device selects N2 entity subdevices from N1 entity subdevices deployed in the cloud terminal device or connected to the cloud terminal device, and instructs the N2 entity subdevices to perform data processing based on the first data processing instruction, where a first virtual master device and the N2 entity subdevices are of a same device type. A virtual master device that can be always in a connected and online state is introduced, and the virtual master device manages entity subdevices of a same type, thereby helping implement dynamic switching of multiple entity subdevices of a same type; in addition, when N2, is greater than 1, the multiple entity subdevices of the same type can be used simultaneously, and moreover, the virtual master device is used as an intermediate management node, and an application program may not sense a status of an entity subdevice, thereby helping implement plug-and-play of an entity subdevice newly connected to the cloud terminal device. It can be seen that, based on the foregoing technical solutions, when the cloud terminal device can be connected to the multiple function devices (such as multiple network interface cards or multiple audio cards or multiple video cards) of the same type, it helps improve flexibility in using the multiple function devices of the same type.

Figure 5:
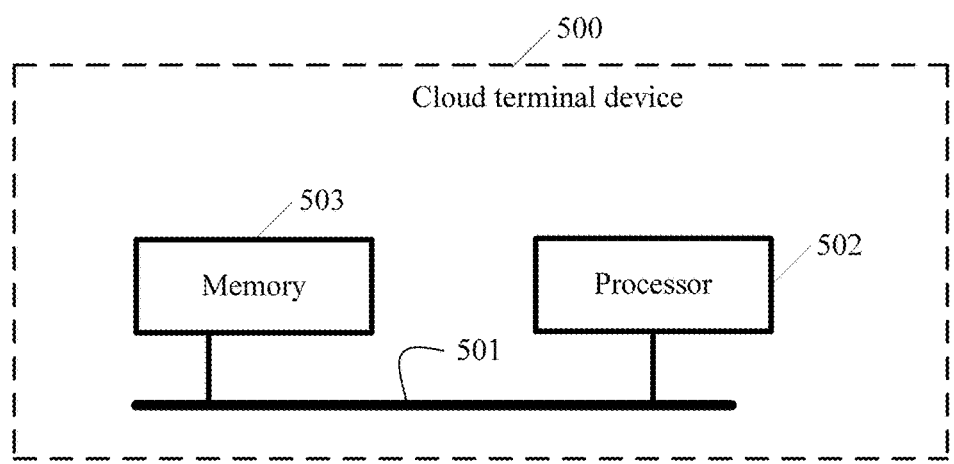
FIG. 5 is a schematic diagram of another cloud terminal device according to an embodiment of the present disclosure.

FIG. 5 is a schematic diagram of a cloud terminal device provided in the present disclosure. As shown in FIG. 5, a cloud terminal device 500 of the embodiment includes at least one bus 501, at least one processor 502 connected to the bus 501, and at least one memory 503 connected to the bus 501.

The processor 502 invokes code stored in the memory 503 using the bus 501 so as to display a virtual master device, where the virtual master device is configured to receive a data processing instruction; selects N2 entity subdevices from the N1 entity subdevices according to a set policy, and instructs the selected N2 entity subdevices to perform data processing based on the data processing instruction, where N1 and N2 are positive integers, N2 is less than or equal to N1, the virtual master device and the N2 entity subdevices are of a same device type, and the N1 entity subdevices are deployed in the cloud terminal device 500 or connected to the cloud terminal device 500.

In some embodiments of the present disclosure, the virtual master device may acquire priorities of being used separately corresponding to the N1 entity subdevices, select N2 entity subdevices with highest priorities of being used from the N1 entity subdevices, and instruct the selected N2 entity subdevices to perform data processing based on the data processing instruction; or the virtual master device may acquire priorities of being used separately corresponding to the N1 entity subdevices, select, from the N1 entity subdevices, N2 currently unused entity subdevices with highest priorities of being used, and instruct the selected N2 entity subdevices to perform data processing based on the data processing instruction; or, the virtual master device may acquire priorities of being used separately corresponding to the N1 entity subdevices, and if priorities of being used of the N2 entity subdevices in the N1 entity subdevices are the highest and the same, select the N2 entity subdevices, and instruct each entity subdevice in the N2 entity subdevices to process, according to a ratio of a usage weight of each entity subdevice to a total usage weight of the N2 entity subdevices, data that is requested by the data processing instruction to process.

In other embodiments of the present disclosure, the data processing instruction comes from an application program.

The virtual master device may select, from the N1 entity subdevices, N2 entity subdevices that the usage priority of the application program is highest, and instruct the selected N2 entity subdevices to perform data processing based on the data processing instruction; or the virtual master device may select, from the N1 entity subdevices, N2 currently unused entity subdevices that the usage priority of the application program is highest, and instruct the selected N2 entity subdevices to perform data processing based on the data processing instruction; or, the virtual master device may acquire usage priorities for the N1 entity subdevices by the application program, and if usage priorities for the N2 entity subdevices in the N1 entity subdevices by the application program are the highest and the same, select the N2 entity subdevices, and instruct each entity subdevice in the N2 entity subdevices to process, according to a ratio of a usage weight of each entity subdevice to a total usage weight of the N2 entity subdevices, data that is requested by the data processing instruction to process.

In some embodiments of the present disclosure, the virtual master device is a virtual network interface card, and the N1 entity subdevices are N1 entity network interface cards; or, the virtual master device is a virtual audio card, and the N1 entity subdevices are N1 entity audio cards; or, the virtual master device is a virtual video card, and the N1 entity subdevices are N1 entity video cards; or, the virtual master device is a virtual printer, and the N1 entity subdevices are N1 entity printers.

It may be understood that functions of function components of the cloud terminal device 500 in this embodiment may be implemented according to the methods in the foregoing method embodiments. For a specific implementation process of the functions of the function modules, reference may be made to a related description of the foregoing method embodiments, and details are not described herein again.

It can be seen from the foregoing that in this embodiment, the virtual master device is deployed in the cloud terminal device, and after the virtual master device receives a first data processing instruction, the virtual master device selects N2 entity subdevices from N1 entity subdevices deployed in the cloud terminal device or connected to the cloud terminal device, and instructs the N2 entity subdevices to perform data processing based on the first data processing instruction, where a first virtual master device and the N2 entity subdevices are of a same device type. A virtual master device that can be always in a connected and online state is introduced, and the virtual master device manages entity subdevices of a same type, thereby helping implement dynamic switching of multiple entity subdevices of a same type; in addition, when N2, is greater than 1, the multiple entity subdevices of the same type can be used simultaneously, and moreover, the virtual master device is used as an intermediate management node, and an application program may not sense a status of an entity subdevice, thereby helping implement plug-and-play of an entity subdevice newly connected to the cloud terminal device. It can be seen that, based on the foregoing technical solutions, when the cloud terminal device can be connected to the multiple function devices (such as multiple network interface cards or multiple audio cards or multiple video cards) of the same type, it helps improve flexibility in using the multiple function devices of the same type.

An embodiment of the present disclosure further provides a computer storage medium, where the computer storage medium may store a program, and when the program is executed, some or all steps of a method for controlling a management device recorded in the foregoing method embodiments are included.

It should be noted that, for brief description, the foregoing method embodiments are represented as a series of actions. However, persons skilled in the art should appreciate that the present disclosure is not limited to the described order of the actions, because according to the present disclosure, some steps may be performed in other orders or simultaneously. In addition, persons skilled in the art should also understand that the embodiments described in this specification all belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the foregoing unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described in the foregoing as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit in the foregoing may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present disclosure. The foregoing storage medium includes any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present disclosure.

What is claimed is:

1. A method for controlling a management device, comprising:

receiving, by a virtual master device deployed in a cloud terminal device, a data processing instruction;

selecting, by the virtual master device, N2 entity subdevices from N1 entity subdevices according to a set policy; and
instructing the selected N2 entity subdevices to perform data processing based on the data processing instruction,
wherein N1 and N2 are positive integers, N2 is less than or equal to N1, the virtual master device and the N2 entity subdevices are of a same device type, and the N1 entity subdevices are one of deployed in the cloud terminal device and connected to the cloud terminal device,
wherein the data processing instruction comes from an application program, and
wherein selecting the N2 entity subdevices from the N1 entity subdevices according to the set policy comprises one of:
selecting, from the N1 entity subdevices, N2 entity subdevices that a usage priority of the application program is highest; or
selecting, from the N1 entity subdevices, N2 currently unused entity subdevices that the usage priority of the application program is highest.

2. The method of claim 1, wherein selecting the N2 entity subdevices from the N1 entity subdevices the set policy, and instructing the selected N2 entity subdevices to perform data processing based on the data processing instruction, comprises:
acquiring priorities of being used separately corresponding to the N1 entity subdevices;
selecting, when priorities of being used of the N2 entity subdevices in the N1 entity subdevices are the highest and the same, the N2 entity subdevices; and
instructing each entity subdevice in the N2 entity subdevices to process, according to a ratio of a usage weight of each entity subdevice to a total usage weight of the N2 entity subdevices, data that is requested by the data processing instruction to process.

3. The method of claim 1, wherein the data processing instruction comes from an application program, and wherein selecting the N2 entity subdevices from the N1 entity subdevices the set policy, and instructing the selected N2 entity subdevices to perform data processing based on the data processing instruction, comprises:
acquiring usage priorities for the N1 entity subdevices by the application program;
selecting, when usage priorities for the N2 entity subdevices in the N1 entity subdevices by the application program are the highest and the same, the N2 entity subdevices; and
instructing each entity subdevice in the N2 entity subdevices to process, according to a ratio of a usage weight of each entity subdevice to a total usage weight of the N2 entity subdevices, data that is requested by the data processing instruction to process.

4. The method of claim 1, wherein the virtual master device is a virtual network interface card, and wherein the N1 entity subdevices are N1 entity network interface cards.

5. The method of claim 1, wherein the virtual master device is a virtual audio card, and wherein the N1 entity subdevices are N1 entity audio cards.

6. The method of claim 1, wherein the virtual master device is a virtual video card, and wherein the N1 entity subdevices are N1 entity video cards.

7. The method of claim 1, wherein the virtual master device is a virtual printer, and wherein the N1 entity subdevices are N1 entity printers.

8. A cloud terminal device, wherein a virtual master device is deployed in the cloud terminal device, and wherein the virtual master device comprises:
a receiver configured to receive a data processing instruction; and
a distribution manager configured to select N2 entity subdevices from N1 entity subdevices according to a set policy and instruct the selected N2 entity subdevices to perform data processing based on the data processing instruction, wherein N1 and N2 are positive integers, N2 is less than or equal to N1, the virtual master device and the N2 entity subdevices are of a same device type, and the N1 entity subdevices are one of deployed in the cloud terminal device and connected to the cloud terminal device,
wherein the distribution manager is further configured to at least one of:
acquire priorities of being used separately corresponding to the N1 entity subdevices, select N2 entity subdevices with highest priorities of being used from the N1 entity subdevices, and instruct the selected N2 entity subdevices to perform data processing based on the data processing instruction;
acquire priorities of being used separately corresponding to the N1 entity subdevices, select, from the N1 entity subdevices, N2 currently unused entity subdevices with highest priorities of being used, and instruct the selected N2 entity subdevices to perform data processing based on the data processing instruction; or
acquire priorities of being used separately corresponding to the N1 entity subdevices, and when priorities of being used of the N2 entity subdevices in the N1 entity subdevices are the highest and the same, select the N2 entity subdevices, and instruct each entity subdevice in the N2 entity subdevices to process, according to a ratio of a usage weight of each entity subdevice to a total usage weight of the N2 entity subdevices, data that is requested by the data processing instruction to process.

9. The cloud terminal device of claim 8, wherein the receiver is configured to receive the data processing instruction from an application program, and wherein the distribution manager is configured to select, from the N1 entity subdevices, N2 entity subdevices that a usage priority of the application program is highest, and instruct the selected N2 entity subdevices to perform data processing based on the data processing instruction.

10. The cloud terminal device of claim 8, wherein the receiver is configured to receive the data processing instruction from an application program, and wherein the distribution manager is further configured to select, from the N1 entity subdevices, N2 currently unused entity subdevices that a usage priority of the application program is highest, and instruct the selected N2 entity subdevices to perform data processing based on the data processing instruction.

11. The cloud terminal device of claim 8, wherein the receiver is configured to receive the data processing instruction from an application program, and
wherein the distribution manager is further configured to acquire usage priorities for the N1 entity subdevices by the application program;
select, when usage priorities for the N2 entity subdevices in the N1 entity subdevices by the application program are the highest and the same, the N2 entity subdevices; and instruct each entity subdevice in the N2 entity subdevices to process, according to a ratio of a usage weight of each entity subdevice to a total usage weight of the N2 entity subdevices, data that is requested by the data processing instruction to process.

12. The cloud terminal device of claim 8, wherein the virtual master device is a virtual network interface card, and wherein the N1 entity subdevices are N1 entity network interface cards.

13. The cloud terminal device of claim 8, wherein the virtual master device is a virtual audio card, and wherein the N1 entity subdevices are N1 entity audio cards.

14. The cloud terminal device of claim 8, wherein the virtual master device is a virtual video card, and wherein the N1 entity subdevices are N1 entity video cards.

15. The cloud terminal device of claim 8, wherein the virtual master device is a virtual printer, and wherein the N1 entity subdevices are N1 entity printers.

16. A method for a virtual master device deployed in a cloud terminal device, the method comprising:
    receiving a data processing instruction;
    acquiring priorities of being used separately for a plurality of N1 entity subdevices coupled with the cloud terminal device;
    selecting a plurality of N2 entity subdevices from the plurality of N1 entity subdevices based on a set policy when the priorities of being used separately are highest and same, where N1 is a positive integer being less than or equal to N1; and
    instructing each entity subdevice of the plurality of N2 entity subdevices to perform data processing based on the data processing instruction based on a ratio of a usage weight of the each entity subdevice of the plurality of N2 entity subdevices to a total usage weight of the N2 entity subdevices,
    wherein the each entity subdevice of the plurality of N2 entity subdevices are of a same device type as the virtual master device.

17. The method of claim 16, wherein the data processing instruction is generated by an application program, and wherein the priorities of being used separately to the N1 entity subdevices are acquired from the application program.

18. The method of claim 16, wherein the virtual master device is a virtual network interface card, and wherein the plurality of N1 entity subdevices are a plurality of N1 entity network interface cards.

19. The method of claim 16, wherein the virtual master device is a virtual audio card, and wherein the plurality of N1 entity subdevices are a plurality of N1 entity audio cards.

20. The method of claim 16, wherein the virtual master device is a virtual video card, and wherein the plurality of N1 entity subdevices are a plurality of N1 entity video cards.

* * * * *

UNITED STATES PATENT AND TRADEMARK OFFICE
CERTIFICATE OF CORRECTION

PATENT NO. : 10,218,578 B2
APPLICATION NO. : 14/981085
DATED : February 26, 2019
INVENTOR(S) : Bo Li Page 1 of 1

It is certified that error appears in the above-identified patent and that said Letters Patent is hereby corrected as shown below:

On the Title Page

Item (30), Line 1: "201310313835" should read "201310313835.8"

Item (57), Line 5: "subdevices a set policy" should read "subdevices according to a set policy"

In the Claims

Column 21, Line 25: "subdevices the set" should read "subdevices according to the set"

Column 21, Line 42: "subdevices the set" should read "subdevices according to the set"

Signed and Sealed this
Eleventh Day of June, 2019

Andrei Iancu
*Director of the United States Patent and Trademark Office*